United States Patent
Nussbaum et al.

(10) Patent No.: US 7,742,248 B2
(45) Date of Patent: Jun. 22, 2010

(54) APPARATUS AND METHOD FOR SETTING A PARAMETER OF A LENS OF A TELEVISION, VIDEO OR STUDIO CAMERA

(75) Inventors: Juergen Nussbaum, Ottobrunn (DE); Harm Abrahams, Munich (DE)

(73) Assignee: Chrosziel GmbH, Heimstetten (DE)

( * ) Notice: Subject to any disclaimer, the term of this patent is extended or adjusted under 35 U.S.C. 154(b) by 17 days.

(21) Appl. No.: 12/012,634

(22) Filed: Feb. 5, 2008

(65) Prior Publication Data

US 2008/0186599 A1 Aug. 7, 2008

(30) Foreign Application Priority Data

Feb. 5, 2007 (DE) .................. 20 2007 001 639 U

(51) Int. Cl.
*G02B 7/02* (2006.01)
(52) U.S. Cl. ..................................... 359/823
(58) Field of Classification Search .................. 359/823
See application file for complete search history.

(56) References Cited

U.S. PATENT DOCUMENTS 3,953,104 A * 4/1976 Roitz et al. .................. 359/616
5,315,340 A * 5/1994 Hirasawa ..................... 396/81

* cited by examiner

*Primary Examiner*—Ricky L Mack
*Assistant Examiner*—Vipin M Patel
(74) *Attorney, Agent, or Firm*—Karl F. Milde, Jr.; Eckert Seamans Cherin & Mellott, LLC

(57) ABSTRACT

An apparatus is used to manually set a parameter of a lens of a television, video or studio camera, and especially to set the distance between the camera and an object which is to be photographed. The apparatus which is connectable with the camera, has a hand wheel that can be rotated about an axis of rotation, as well as an adjusting wheel that can be connected through a gear mechanism with the hand wheel to engage a corresponding wheel at the lens for setting the parameter. Two stops, which can be adjusted variably relative to one another and fixed at different angular positions, are provided for limiting the angle of rotation of the hand wheel. A counterstop, arranged in the path of the two stops, is connected torsionally rigidly with the hand wheel.

4 Claims, 2 Drawing Sheets

APPARATUS AND METHOD FOR SETTING A PARAMETER OF A LENS OF A TELEVISION, VIDEO OR STUDIO CAMERA

BACKGROUND OF THE INVENTION

The invention relates to an apparatus and to a method for manually setting a parameter of a lens of a television, video or studio camera. In particular, the invention relates to an apparatus and a method for manually setting the distance between the camera and an object, which is to be photographed. Especially, it shall be possible to set the distance herewith for electronic camera with auto focusing.

The German utility patent 20308400 discloses a device, which has a holder, which can be connected with the camera, for a hand wheel, which can be rotated about an axis of rotation, and a gear mechanism, which is brought into engagement with an adjusting hand wheel in a corresponding wheel at the lens for setting the parameter and especially the distance. Between the hand wheel and the adjusting hand wheel, a wheel drive is provided, for example with gear wheels, so that this apparatus works absolutely without clearance.

For some photographing situations, it is necessary to switch the lens frequently between two distance values, for example, when photographing a discussion between two persons, for which the cameraman must adjust the lens for each new alignment of the camera, in order to achieve the desired sharpness or an intentional fuzziness.

This manual setting of the distance is particularly critical for modern electronic television, video or studio cameras with auto focusing. They have the advantage that a cameraman no longer has to set the desired distance between the camera and the object to be photographed manually and that, instead, this is done automatically, for example, by a contrast measurement or a phase comparison. In many cases, especially when the object to be photographed is not in the region of the field of view of the lens, which is the measuring region for the auto focusing, it is desirable to be able to set this parameter also manually, in order to set the sharpness and fuzziness selectively.

However, the known apparatus of the aforementioned DE 20308400, in conjunction with electronic cameras, cannot be taken over in this form for setting the distance manually. If, for example, a lens, aimed with the camera, is focused by the automatic focusing feature, the distance ring of the lens can be rotated manually, without changing the focusing thereby. This is the case especially when the setting limits of infinity and close up are reached, because a manual adjustment of the distance does not lead to a change in the distance setting in every case, but only to a loss of the reference point for the distance setting, so that the cameraman must focus the lens once again.

This is extremely tedious for a cameraman, for example, when two parties to an interview are photographed at different distances; each time the lens has to be focused or the desired fuzziness set once again.

SUMMARY OF THE INVENTION

It is an object of the invention to indicate a device for setting a parameter of a lens of a television, video or studio camera, with which the distance settings, desired by a cameraman, can be fixed reproducibly and independently of an electronic focusing. A simple method for this is also to be given.

Pursuant to the invention, the apparatus is provided with two stops. The angular distance between the stops can be adjusted variably and fixed depending on the photographing situation. Preferably the position of a first stop for a first setting of the parameter is fixed; a second stop for a second setting of the parameter can be set and fixed at a variable angular distance from the first stop. Normally, the parameter is the distance; however, it is possible to use the focal length or different lens data as the parameter.

With this, it is possible to set the parameter and especially the distance independently of the auto focusing setting, so that, for example, objects, which lie outside of the measuring range of the lens for auto focusing, can also be focused sharply. When recording an interview between two partners, the cameraman can then fix the second stop so that, independently of the distance setting by the auto focusing, these partners are always focused sharply, even the interview partners are outside of the measuring range of the lens.

It is an advantage of the inventive device that a cameraman does not have to find a new reference point once again whenever he wants to focus on the object to be photographed. This reference point is always set permanently by the variably adjustable and fixable stops.

When working with an electronic camera, a cameraman will first of all point at the first object and focus it sharply with the auto focusing device; at this stage, the hand wheel is at the first stop. Subsequently, the auto focusing is switched off, after which the cameraman will point at the second object and focus manually or set the fuzziness desired for this second object. The second stop is then set by the cameraman so that this second, selected position of the lens is fixed. While photographing, the cameraman can then change between the two set stops by adjusting the hand wheel manually.

In accordance with a preferred embodiment of the invention, the hand-wheel is connected with a ring arrangement of two concentric rings, which can be rotated concentrically to one another and each of which carries a stop for a stop finger, which is connected rigidly with the shaft of the hand wheel. The rings can be fixed in their angular position to one another by a locking element. For this purpose, a ring preferably has a pivotal link, which runs in a circular arc, which is concentric with the shaft of the hand wheel, the ring element sliding in the pivoted link, which it can be actuated so that the two rings of the ring arrangement can either be twisted relative to one another or fixed relative to one another at a certain angular spacing.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
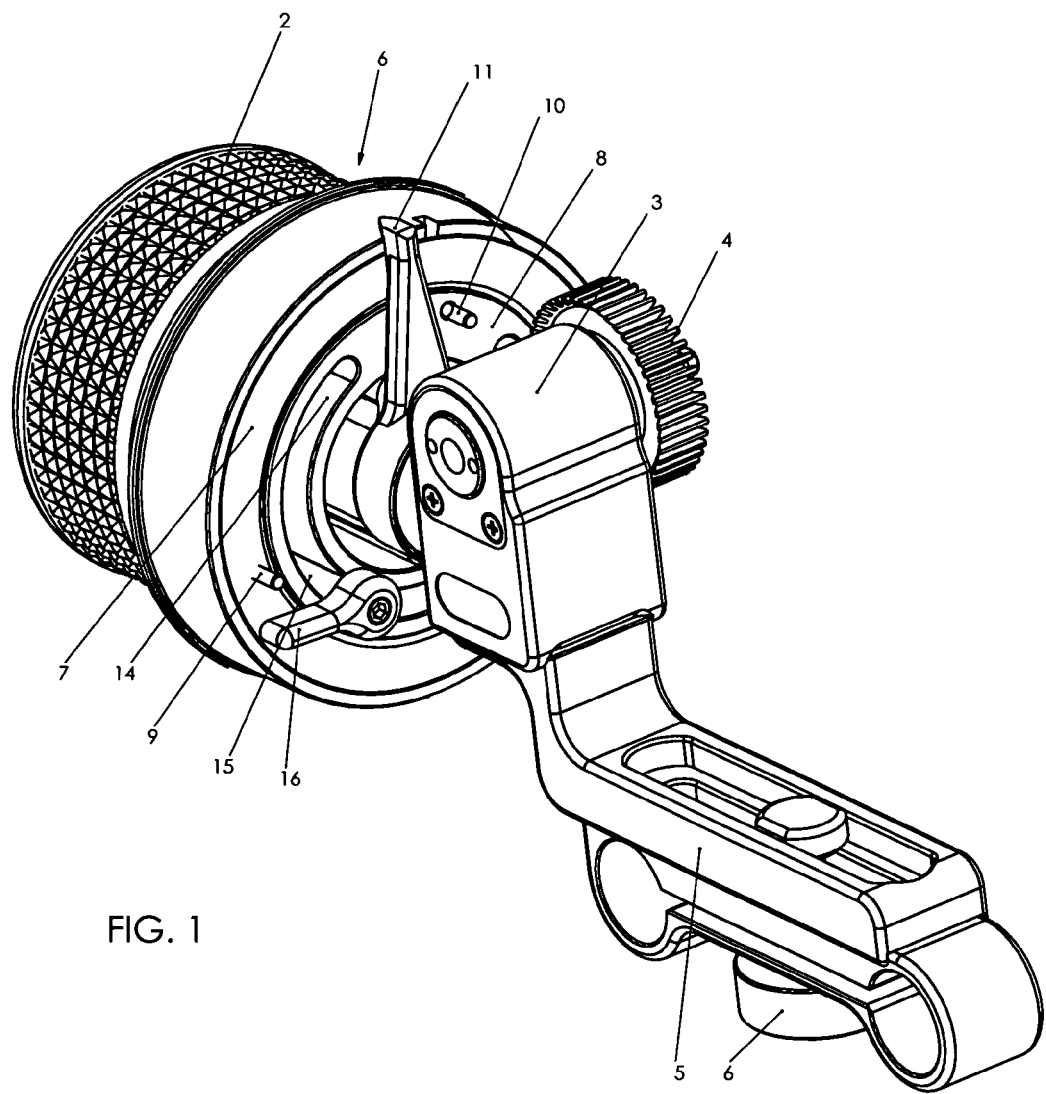
FIG. 1 shows a perspective representation of a device for manually adjusting the distance of a camera lens.

The preferred embodiments of the present invention will now be described with reference to FIGS. 1-2 of the drawings. Identical elements in the various figures are designated with the same reference numerals.

Figure 2:
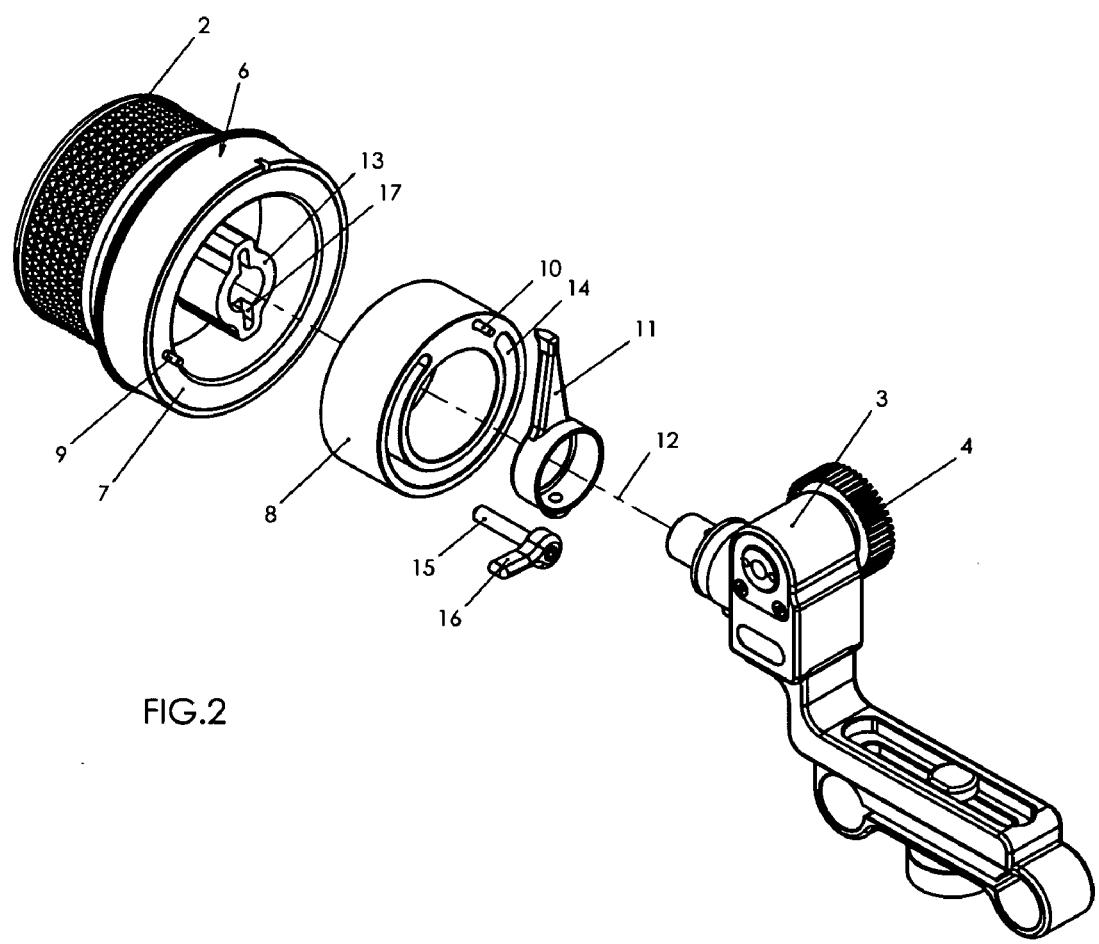
FIG. 2 shows a perspective, exploded representation of the apparatus of FIG. 1.

An apparatus 1 for setting the distance of a lens of an electronic camera with auto focusing is shown in FIG. 1. This apparatus has a rotatable hand wheel 2, which is connected over a bevel gear system 3 with a regulator wheel 4, which engages a corresponding gear wheel of the lens. The hand wheel 2 and the bevel gear system 3 with the regulator wheel 4 are fastened to a holder 5, which is pushed onto supporting tubes, which are not shown here and which are, for example, parts of a tripod or a combined extension bellows and slide-copying attachment of a conventional analog or electronic camera with auto focusing and can be fastened with the help of a clamping nut 6. A ring arrangement 6 of a first outer ring 7 and a second inner ring 8 is located between the hand wheel 2 and the bevel gear system 3. Each of the rings has a stop at its periphery, in this case a stop pin 9 or 10, for a stop finger 11, which is connected rigidly with the shaft of the hand wheel 2 and with the axis of rotation 12 of the hand wheel 2. This axis of rotation 12 is shown by a broken line in FIG. 2 and is also the input axis for the bevel gear system 3.

The outer ring 7 with the stop 9 is disposed rotatably on a shaft end 13 of the hand wheel. On the other hand, the inner ring 8 with its stop 10 is slipped torsionally rigidly on this shaft end 13. The inner ring 8 has a circular, slot-like pivoted link 14, which extends clockwise from the stop 10 over an angular region of 320°. An axis 15 of a toggle-like locking element 16 is passed through this pivoted link and fixed in a lateral groove 17 of the shaft end 13 of the hand wheel 2. In a first position of this locking element 16, the two rings 7 and 8 can be rotated relative to one another. In the second position, however, the angular position of the two rings is fixed. This is accomplished, for example, with the help of a cam-like configuration of the contacting surface of the locking element 16 against the inner ring 8. This fixed position of the two rings of the ring arrangement 6 is shown in FIG. 1, the angular spacing between the two stops 9 and 10 being, for example about 110°.

The angular spacing is set in the following way. To begin with, the stop finger 11 is brought into contact with the stop 10 of the inner ring 8, after which the object, which is to be focused sharply, is sighted directly and focused manually or with the help of the auto focusing feature of the electronic camera. Subsequently, optionally after the auto focusing feature is switched off, the second object, which is to be photographed, is sighted and focused sharply. This setting is made by rotating the outer ring 7 of the ring arrangement. Then, when the focusing is taken over, the angular spacing of the inner ring 8 with respect to the outer ring 7 is fixed by locking the locking element 16.

If a cameraman now sights the first object, the hand wheel is rotated so that the stop finger 11 rests against the stop 10 of the inner ring 8. When the second object is sighted, the hand wheel is rotated so that stop finger 11 rests against the stop 9 of the outer ring 7. Even if the two objects, which are to be photographed, for example, interview partners, are not in the same measurement field of the lens, these means ensure that object, which is to be photographed, is in focus or out of focus to the desired degree.

Especially if one of the settings is at the limit of the setting range of the lens of an electronic camera with auto focusing, "overshooting" the parameter, that is, especially the distance setting, which in this case would, as explained, lead to a loss of all settings, is avoided by the construction of the apparatus.

As stated, the inventive device can be used with conventional as well as with electronic cameras, taking away the burden from the cameraman in every case.

There has thus been shown and described a novel apparatus and method for setting a parameter of a lens of a television, video or studio camera which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An apparatus for manually setting a parameter of a lens of a television, video or studio camera, especially for setting the distance between the camera and an object which is to be photographed, the apparatus being connectable with the camera and having a hand wheel which can be rotated about an axis of rotation, as well as an adjusting wheel which can be connected through a gear mechanism with the hand wheel and engages a corresponding wheel at the lens for setting the parameter, the improvement comprising two stops, which can be adjusted variably relative to one another and fixed at different angular positions, for limiting the angle of rotation of the hand wheel;

wherein the hand wheel is connected with a ring arrangement of two rings that can be rotated relative to one another and each of which carries one of the two stops for a stop finger that is connected torsionally rigidly with a shaft of the hand wheel; wherein the angular position of the two rings relative to one another can be fixed by a locking element; and wherein the locking element is constructed so that, in a first position, it permits the rotation of the two rings of the ring arrangement relative to one another and, in a second position, it fixes the rings relative to one another at a prescribed angular spacing.

2. The apparatus of claim 1, comprising a first stop, having a fixed position for a first setting of the parameter, and a second stop, wherein the angular distance of the second stop from the first stop can be adjusted variably and fixed for a second setting of the parameter.

3. The apparatus of claim 1, wherein one of the two rings of the ring arrangement has a slot-like pivoted link that moves in a circular arc, concentric with the shaft of the hand wheel, and wherein the slot-like pivoted link receives the locking element.

4. A method for manually setting a parameter of a lens of an electronic television, video or studio camera with an auto-focusing device for setting the distance between the camera and an object that is to be photographed, said method comprising the steps of:

sighting a first object to be photographed with a first, fixed setting of the lens;

focusing on the first object;

sighting on a second object with the auto-focusing feature switched off;

bringing the second object into a sharp or deliberately fuzzy focus with a second setting of the lens, wherein this second setting of the lens is also fixed.

\* \* \* \* \*